| (12) | United States Patent | (10) Patent No.: | US 8,579,232 B2 |
|---|---|---|---|
| | Hemeury et al. | (45) Date of Patent: | Nov. 12, 2013 |

(54) AIRCRAFT NACELLE INCORPORATING A DEVICE FOR PROTECTING AN ACCESS FLAP FOR A LOCKING SYSTEM

(75) Inventors: Philippe Hemeury, Blagnac (FR); Christian Gerri, Fonsorbes (FR)

(73) Assignee: Airbus Operations SAS, Toulouse (FR)

( * ) Notice: Subject to any disclaimer, the term of this patent is extended or adjusted under 35 U.S.C. 154(b) by 262 days.

(21) Appl. No.: 12/961,880

(22) Filed: Dec. 7, 2010

(65) Prior Publication Data

US 2011/0133034 A1 Jun. 9, 2011

(30) Foreign Application Priority Data

Dec. 8, 2009 (FR) ...................................... 09 58733

(51) Int. Cl.
  *B64C 1/14* (2006.01)
  *B64D 29/00* (2006.01)
  *E05C 5/00* (2006.01)

(52) U.S. Cl.
  USPC ...................... 244/129.4; 244/53 R; 292/113

(58) Field of Classification Search
  USPC ........ 244/53 R, 53 B, 129.4, 129.5; 292/229, 292/113; 49/381, 383, 379
  See application file for complete search history.

(56) References Cited

U.S. PATENT DOCUMENTS

| 2,712,955 | A | * | 7/1955 | Andrews ........................ 292/113 |
| 2,904,141 | A | * | 9/1959 | Henrichs ........................ 403/321 |
| 5,620,212 | A | | 4/1997 | Bourne et al. |
| 5,664,813 | A | * | 9/1997 | Gromotka ...................... 292/229 |
| 6,279,971 | B1 | * | 8/2001 | Dessenberger, Jr. .......... 292/113 |
| 6,755,448 | B2 | * | 6/2004 | Jackson et al. ................ 292/113 |
| 7,357,593 | B1 | * | 4/2008 | Florence ........................ 403/330 |
| 2003/0151261 | A1 | | 8/2003 | Porte et al. |
| 2004/0104583 | A1 | | 6/2004 | Porte |

FOREIGN PATENT DOCUMENTS

| EP | 1336707 A1 | 8/2003 |
| FR | 2832752 A1 | 5/2003 |
| GB | 2288578 A | 10/1995 |

OTHER PUBLICATIONS

French Search Report, dated Jul. 26, 2010, from corresponding French application.

* cited by examiner

*Primary Examiner* — Tien Dinh

(74) *Attorney, Agent, or Firm* — Young & Thompson

(57) ABSTRACT

An aircraft includes a part defining an aerodynamic surface against which flows an air stream, with at least one hood able to block an opening made at the aerodynamic surface, kept in the closed position by at least one locking mechanism, and an access flap for the locking mechanism, pivoting relative to the hood around an axis substantially parallel to the flow direction of the air stream and including elements for keeping it flattened against the hood, characterized in that it includes a device for protection of the access flap that includes a coverage plate that pivots around an axis of rotation, and which is able to occupy a first position in which it projects relative to the aerodynamic surface and another position in which after pivoting around the axis of rotation, it is flattened against the outside surface of the access flap such that the protective device limits the appearance of a scoop phenomenon.

10 Claims, 3 Drawing Sheets

AIRCRAFT NACELLE INCORPORATING A DEVICE FOR PROTECTING AN ACCESS FLAP FOR A LOCKING SYSTEM

BACKGROUND OF THE INVENTION

1. Field of the Invention

This invention relates to an aircraft nacelle incorporating a device for protecting an access flap for a locking system.

2. Description of the Related Art

Illustrated in FIG. 1, the power plant of an aircraft is integrated inside a structure, called nacelle 10 below, connected by connecting means to the aircraft, in particular by a mast 12 to the wing.

This nacelle has several functions, in particular those of regulating and controlling the movements of air in and around the engine so as to optimize the aerodynamic flow, protecting the engine from outside elements, minimizing noise pollution, ventilating the internal zones, participating in the dispersion of mechanical stresses of the engine, and optionally supporting the thrust reverser systems.

Finally, the nacelle is to make possible the daily maintenance and the servicing of the engine and its components.

For this purpose, the nacelle comprises, at its outside surface 14, an opening that allows access to the inside of the nacelle and a movable part 16 that can occupy at least two positions, a first so-called closed position in which said movable part is located in the extension of the outside surface of the nacelle so as to block said opening, and a second position in which it at least partially releases the opening.

For the remainder of the description, the movable part 16 is called a hood.

BRIEF SUMMARY OF THE INVENTION

In general, the nacelle 10 comprises two symmetrical hoods 16, 16' that are articulated around pivoting axes that are parallel to the longitudinal axis 18 of the nacelle, arranged on both sides of the mast 12.

According to this configuration, the lower edges of the hoods 16, 16' are essentially contiguous in the closed position and are kept in this position by locking mechanisms 20 that are dispersed along the lower edges of the hoods.

For protecting these locking mechanisms 20 by limiting access, the nacelle can comprise an access flap 22 for locking mechanisms, mounted to pivot around an axis of rotation 24 that is parallel to the longitudinal axis 18 of the nacelle. Such an access flap 22 is described in particular in the document FR-2,832,752.

The shapes of the hoods 16, 16' and the access flap 22 are such that the outside surface of the access flap 22 is arranged in the extension of the outside surface of the stationary part of the nacelle that is arranged upstream from said access flap 22.

This access flap has a rectangular shape with long sides oriented along the longitudinal axis 18 of the nacelle, of which one is mounted to pivot around the axis of rotation 24 relative to the hood and with short sides perpendicular to the longitudinal axis 18. One of the short sides 26.1 is arranged at the front, and the other short side 26.2 is arranged at the back.

According to one embodiment, the access flap 22 comprises four hinges 28 that are arranged over its length to make possible the pivoting of said flap around the axis of rotation 24.

The access flap 22 comprises at least one locking mechanism 30 to keep it in the closed position, in which said flap 22 is flattened against the hoods in such a way that its outside surface is in the extension of the outside surface of the stationary surface of the nacelle that is arranged upstream from said access flap 22. In general, the access flap 22 comprises several locking mechanisms 30 (for example, four) arranged along its length, whereby the first locking mechanism 30 is offset toward the rear relative to the front short side 26.1 of said flap.

In the event of malfunction, in particular because of the locking mechanism 30 that is arranged at the front not closing or due to its wear or because of the wear or the breaking of the articulation 28 arranged at the front, a scoop phenomenon can arise, whereby the access flap 22 tends to be ajar and to make it possible for the air stream to penetrate between the access flap 22 and the hoods 16, 16' as illustrated in FIG. 4.

This scoop phenomenon can cause the breaking of locking mechanisms 30 and the opening of the access flap 22 or the breaking of said access flap 22.

The purpose of this invention is to limit these risks of opening or deterioration of said access flap 22 by proposing a device for protection of the access flap with a locking system of the hoods.

For this purpose, the invention has as its object an aircraft that comprises a part that defines a stationary aerodynamic surface against which flows an air stream, with at least one hood that is able to block an opening that is made at said stationary aerodynamic surface, kept in the closed position by at least one locking mechanism, as well as an access flap for a locking mechanism of the hood, pivoting relative to the hood around an axis that is essentially parallel to the direction of flow of the air stream and comprising means for keeping it flattened against the hood, characterized in that it comprises a device for protection of the access flap that comprises a coverage plate that pivots around an axis of rotation, preferably perpendicular to the direction of flow of the air stream, whereby said coverage plate is able to occupy a first position in which it is arranged projecting relative to the stationary aerodynamic surface and another position in which said coverage plate—after pivoting around the axis of rotation—is flattened against the outside surface of the access flap in such a way that the protective device limits the appearance of a scoop phenomenon.

BRIEF DESCRIPTION OF THE DRAWINGS

Other characteristics and advantages will emerge from the following description of the invention, a description that is provided only by way of example, relative to the accompanying drawings in which.

DETAILED DESCRIPTION OF THE PREFERRED EMBODIMENTS

Figure 1:
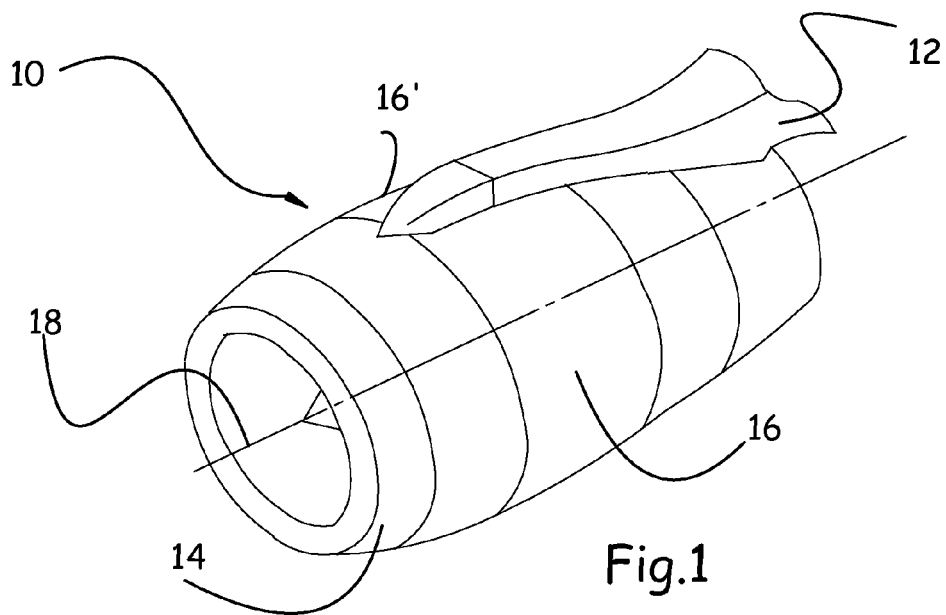
FIG. 1 is a perspective view of an aircraft nacelle.
Figure 2:
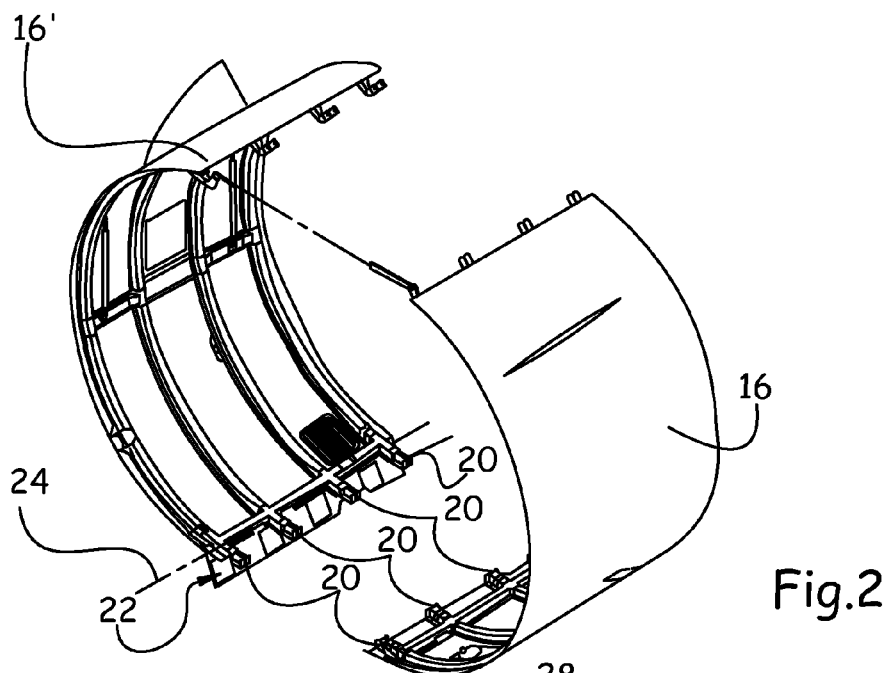
FIG. 2 is a perspective view of the hoods of an aircraft nacelle of which one supports an access flap for a system for locking said hoods.
Figure 3:
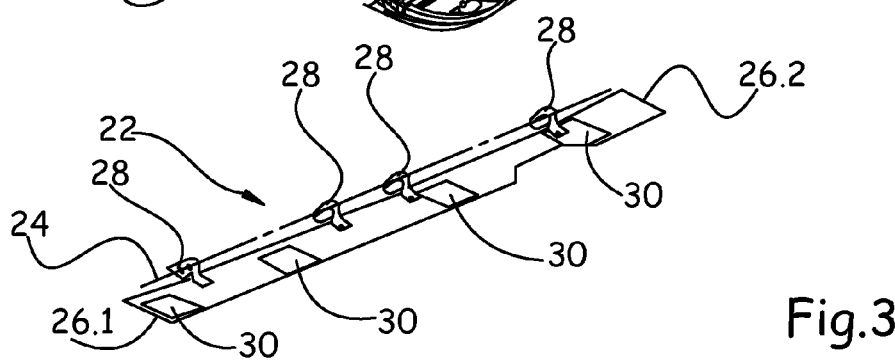
FIG. 3 is a perspective view of the access flap that can be seen in FIG. 2.
Figure 4:
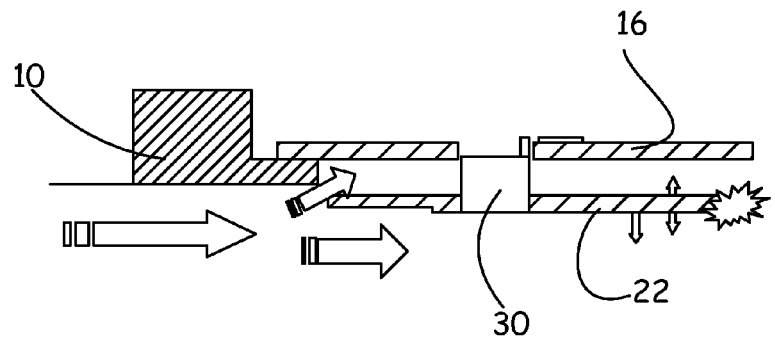
FIG. 4 is a longitudinal cutaway that illustrates the risk of breaking of the access flap because of a scoop phenomenon.

FIGS. 5 to 10 diagrammatically show a stationary part 32 of an aircraft nacelle that defines a stationary aerodynamic surface 34 against which flows an air stream that circulates outside of the nacelle during flight. The direction of the flow of the air stream is referenced 36 in the figures and corresponds to the longitudinal direction of the nacelle.

At its outside surface, the nacelle comprises at least one opening that allows access to the inside of the nacelle and at least one movable part 38 called a hood that can block said opening.

According to one embodiment, the nacelle comprises two symmetrical hoods 38 that are articulated around pivoting axes that are parallel to the longitudinal axis of the nacelle, arranged on both sides of the mast. According to this configuration, the lower edges of the hoods are essentially contiguous in the closed position and are kept in this position by locking mechanisms that are dispersed along the lower edges of the hoods.

For protecting these locking mechanisms by limiting access, the nacelle comprises an access flap 40 for the locking mechanisms of the hood, mounted to pivot around an axis of rotation that is parallel to the longitudinal axis of the nacelle. Such an access flap is described in particular in the document FR-2,832,752.

The shapes of the hoods 38 and the access flap 40 are such that the outside surface of the access flap 40 is arranged in the extension of the stationary aerodynamic surface 34.

According to one embodiment, the access flap 40 has a rectangular shape with long sides oriented along the longitudinal axis and with short sides perpendicular to the longitudinal axis of the nacelle.

In the different figures, only the front portion of the access flap 40 and its short side called front edge 42 below are shown. The front edge 42 is the edge of the flap that is arranged upstream in the direction of flow of the air stream 36.

In a general manner, the invention relates to an access flap for a locking mechanism, whereby said flap pivots around an axis that is essentially parallel to the direction of flow of the air stream 36 and is connected at one edge of at least one movable hood relative to the nacelle.

To keep the access flap 40 in a position that is flattened against the hood(s) 38, the access flap 40 comprises means for keeping it flattened against the hood(s), in particular at least one locking mechanism 44 that can make said access flap 40 integral with a hood or with another portion of the nacelle. In general, the access flap comprises several locking mechanisms that are connected along the length of said flap.

As illustrated in FIGS. 5 to 10, the first locking mechanism 44 that is arranged most forward is distant from the front edge 42.

When the locking mechanism(s) 44 is/are in locked position, the outside surface of the flap is arranged in the extension of the aerodynamic surface 34 of the nacelle.

Figure 5:
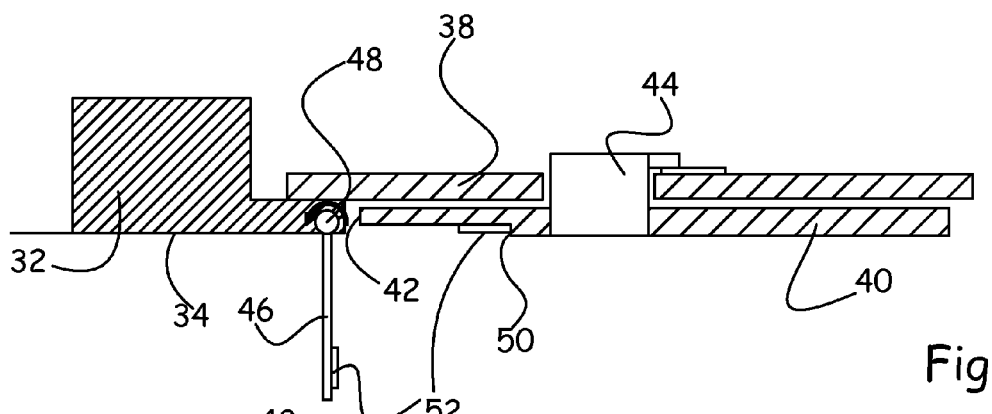
FIG. 5 is a longitudinal cutaway of an access flap that comprises a protective device according to a first variant of the invention in non-retracted position.
Figure 6:
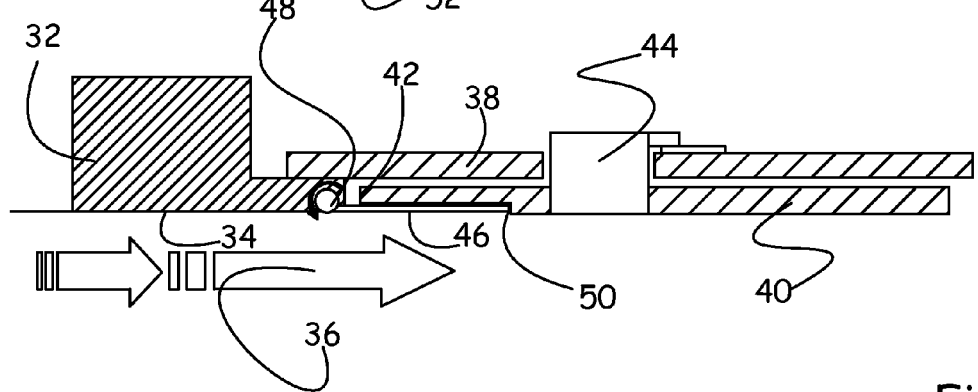
FIG. 6 is a longitudinal cutaway of an access flap that comprises a protective device according to the variant of FIG. 5 in the retracted position.
Figure 8:
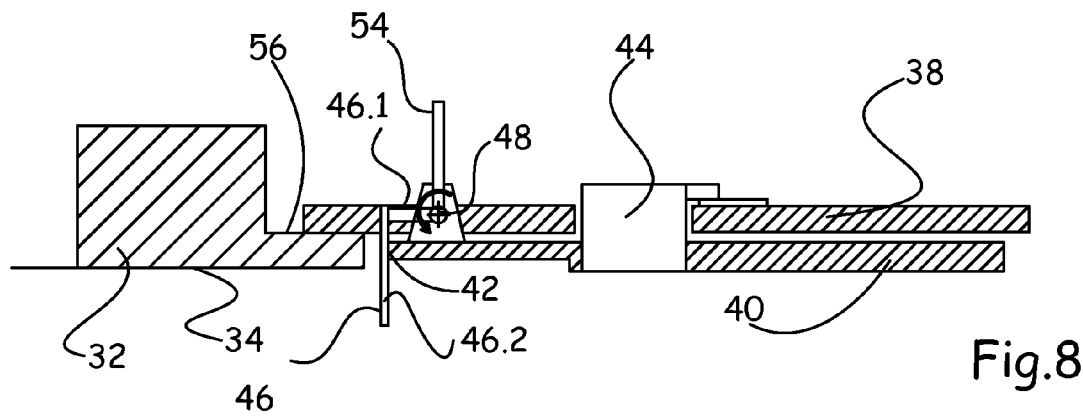
FIG. 8 is a longitudinal cutaway of an access flap that comprises a protective device according to another variant of the invention in the non-retracted position.
Figure 9:
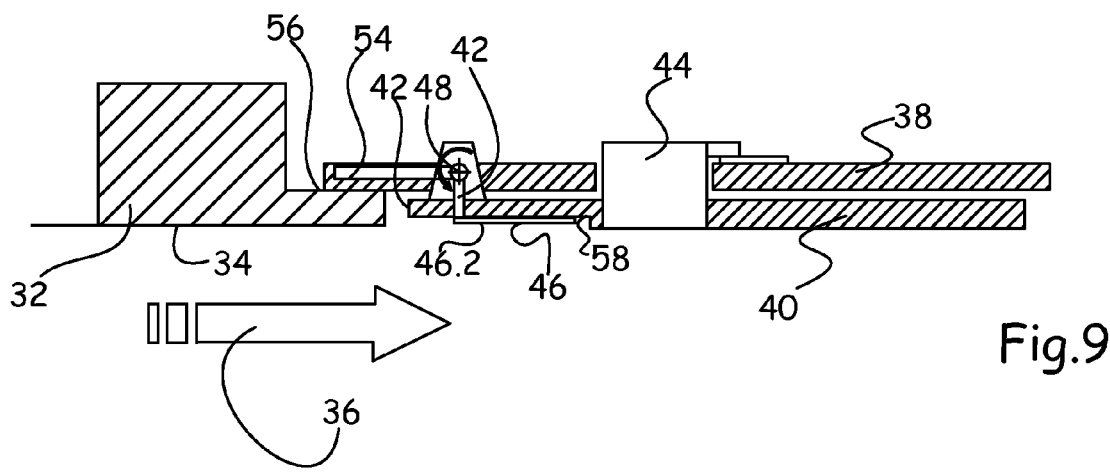
FIG. 9 is a longitudinal cutaway of an access flap that comprises a protective device according to the variant of FIG. 8 in the retracted position.

According to the invention, the nacelle comprises a device for protection of the access flap 40 that comprises a coverage plate 46 that pivots around an axis of rotation 48 that is perpendicular to the direction of flow of the air stream, whereby said coverage plate 46 is able to occupy a first position that is illustrated in FIGS. 5 and 8 in which it is arranged projecting relative to the stationary aerodynamic surface 34 and another position that is illustrated in FIGS. 6 and 9 in which said coverage plate 46—after pivoting around the axis of rotation 48—is flattened against the outside surface of the access flap 40 in such a way that the protective device limits the scoop phenomenon.

Figure 7:
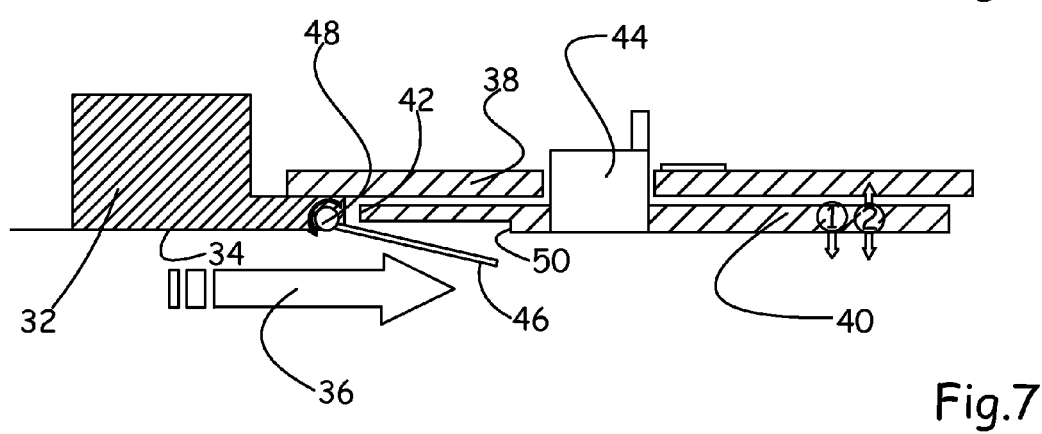
FIG. 7 is a longitudinal cutaway of an access flap that comprises a protective device according to the variant of FIG. 5 during a malfunction of the locking mechanism of said access flap.

According to a first variant that is illustrated in FIGS. 5 to 7, the axis of rotation 48 is integral with the stationary part of the nacelle 32 that is arranged upstream from the access flap 40. The coverage plate 46 has an essentially rectangular shape with a length (parallel to the axis of rotation 48) that is essentially equal to the front edge 42 of the access flap. The width of the coverage plate 46 is sufficient for covering the front part of the access flap and thus for preventing the air stream from penetrating under said access flap.

At its outside surface, the access flap 40 comprises an offset 50 whose shapes are adapted to those of the coverage plate 46 so as to obtain a continuity of the outside surfaces of the stationary part 32 of the nacelle, the coverage plate 46, and the access flap 40.

Advantageously, means are provided for ensuring that the coverage plate 46 is held flattened against the access flap 40. By way of example, it is possible to use facing magnetized surfaces 52 to ensure this holding in flattened position.

As can be seen in FIG. 7, the arrangement of the coverage plate 46 makes it possible to keep the access flap 40 in the closed position even if the locking mechanism 44 is not correctly locked or if the malfunction appears at its level. Actually, during flight, the air flow 36 exerts a relatively significant force on the coverage plate 46 that tends to pivot around the axis of rotation 48 and tends in turn to exert a force on the access flap 40 and to keep it in the closed position.

In addition, even in this configuration where the access flap 40 is slightly removed from the hood, the protective device prevents the appearance of the scoop phenomenon and makes it possible not to stress the access flap and/or the other locking mechanisms 44 of the access flap beyond their mechanical strength.

Figure 10:
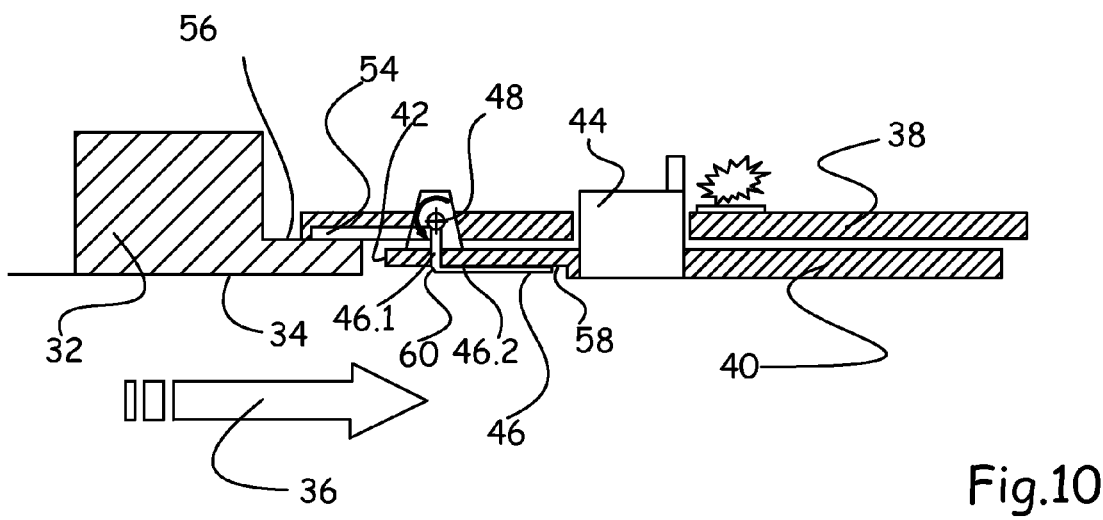
FIG. 10 is a longitudinal cutaway of an access flap that comprises a protective device according to the variant of FIG. 8 during a malfunction of the locking mechanism of said access flap.

According to a second variant that is illustrated in FIGS. 8 to 10, the axis of rotation 48 is integral with the access flap 40 and is arranged close to its front edge 42.

According to one embodiment, the axis of rotation 48 is integral with a support that is connected at the inside surface of the access flap.

According to this second variant, the protective device comprises two plates that are connected to one another, mounted to pivot around the axis of rotation 48: a first coverage plate 46 that is able—in a first position that can be seen in FIG. 8—to be arranged projecting relative to the aerodynamic surface 34 and—in a second position that can be seen in FIG. 9—flattened against the access flap 40, and a second plate 54 arranged inside the access flap 40, and able to rest against the inside surface 56 of the flange of the stationary part 32 of the nacelle that is placed upstream from said access flap 40 when the first plate is in the second position that is flattened against the access flap.

This second variant has the advantage of being able to be mounted on the existing nacelles by changing only the access flap 40.

According to one embodiment, the second plate 54 has a rectangular shape with a length (parallel to the axis of rotation 48) that is less than the front edge 42 of the access flap. The width of this plate 54 is sufficient for resting against the inside surface 56 of the flange of the stationary part of the nacelle so as to prevent the opening of the access flap and thus to prevent the air stream from penetrating below said access flap. Preferably, this plate is arranged in the extension of the axis of rotation 48.

According to one embodiment, the first coverage plate 46 has an L-shaped cross-section with a first part 46.1 that is connected to the axis of rotation 48 and is perpendicular to the second plate 54, and a second part 46.2 that is connected to the first part 46.1 and is perpendicular to the latter, able to be arranged projecting relative to the aerodynamic surface 34 in a first position and flattened against the outside surface of the access flap 40 in a second position. The first part 46.1 makes it possible to offset the second part 46.2 relative to the axis of rotation 48 so that the latter can be flattened against the outside surface of the access flap.

At its outside surface, the access flap 40 comprises an offset 58 whose shapes are adapted to those of the coverage plate 46 in such a way as to obtain a continuity of the outside surfaces of the plate 46 and the access flap 40.

If appropriate, the outside surfaces of the plate 46 and the access flap 40 are in the extension of the aerodynamic surface 34 of the stationary part 32 of the nacelle that is arranged upstream as illustrated in FIG. 9, or slightly offset toward the outside, and the junction of the parts 46.1 and 46.2 has a beveled shape 60 so as not to form a step that can produce strong aerodynamic disturbances, as illustrated in FIG. 10.

Advantageously, means are provided for ensuring the holding of the second part of the plate 46 flattened against the access flap. By way of example, it is possible to use facing magnetized surfaces to ensure this holding in flattened position.

As can be seen in FIG. 10, the arrangement of the plates 46 and 54 makes it possible to keep the access flap 40 in the closed position even if the locking mechanism 44 is not correctly locked or if a malfunction occurs there. Actually, during flight, the air flow exerts a relatively significant force on the plate 46 that tends to pivot around the axis of rotation 48, which causes the rotation of the plate 50 that then rests against the inside surface 56 of the flange of the stationary part of the nacelle. In this way, the force exerted by the air flow on the protective device prevents the access hood 40 from opening and limits the appearance of a scoop phenomenon.

Although described as being applied to a hood of an aircraft nacelle, the invention is not limited to this part of the aircraft and can be applied to all of the hoods or inspection flaps for maintenance that are located at an aerodynamic surface of an aircraft, such as, for example, the inspection flap that is located at the fuselage of the aircraft, more specifically at the lower part of the rear cone of an aircraft.

The invention claimed is:

1. An aircraft nacelle comprising:
   a part (32) defining an aerodynamic surface (34) constructed and arranged to have an air stream (36) flow against,
   at least one hood (38) constructed and arranged to, when in a closed position, block an opening that is made at said aerodynamic surface (34),
   at least one locking mechanism constructed and arranged to keep the at least one hood in the closed position,
   an access flap (40) constructed and arranged to provide access to the at least one locking mechanism of the hood (38), the access flap (40) constructed and arranged to pivot relative to the hood (38) around an axis that is essentially parallel to a direction of flow of the air stream (36), the access flap (40) comprising means (44) for keeping the access flap (40) flattened against the hood (38),
   a protective device for protecting the access flap (40) including:
      a coverage plate (46) constructed and arranged to pivot around an axis of rotation (48), the axis of rotation (48) being perpendicular to the direction of flow of the air stream (36),
      wherein said coverage plate (46) is constructed and arranged to pivot between a first position in which the coverage plate (46) is arranged projecting relative to the aerodynamic surface (34) and a second position in which said coverage plate (46) is flattened against an outside surface of the access flap (40) in such a way that the protective device limits an appearance of a scoop phenomenon.

2. The aircraft nacelle according to claim 1, wherein the axis of rotation (48) is integral with the part (32) that is arranged upstream from the access flap (40).

3. The aircraft nacelle according to claim 2, wherein the coverage plate (46) is of a width that prevents the air stream (36) from passing under the access flap (40).

4. The aircraft nacelle according to claim 1, wherein the axis of rotation (48) is integral with the access flap (40) and arranged close to a front edge of the access flap.

5. The aircraft nacelle according to claim 4:
   wherein the protective device comprises two plates that are connected to one another,
   wherein the two plates are mounted to pivot around the axis of rotation (48)
   wherein the two plates include the coverage plate (46) that is constructed and arranged to pivot between the first position and the second position
   wherein the two plates include a second plate (54) inside the access flap (40), the second plate (54) being constructed and arranged to rest against an inside surface (56) of a flange of the part (32) that is placed upstream from said access flap (40) when the first plate is in the second position.

6. The aircraft nacelle according to claim 5, wherein the coverage plate (46) has an L-shaped cross-section with a first part (46.1) that is connected to the axis of rotation (48) and a second part (46.2) that is connected to the first part (46.1) and is perpendicular to the first part (46.1), the second part (46.2) being constructed and arranged to project relative to the aerodynamic surface (34) in the first position and to lie flat against the outside surface of the access flap (40) in the second position.

7. The aircraft nacelle according to claim 1, wherein at the outside surface of the access flap (40), the access flap (40) comprises an offset (50, 58) whose shapes are adapted to those of the coverage plate (46) so as to obtain a continuity between an outside surface of the coverage plate (46) and the outside surface of the access flap (40).

8. The aircraft nacelle according to claim 1, wherein magnetized surfaces (52) are provided to ensure that the coverage plate (46) is held flattened against the access flap (40).

9. An aircraft comprising:
   the aircraft nacelle according to claim 1, and
   an aircraft chassis.

10. An aircraft nacelle comprising:
    a part defining an aerodynamic surface constructed and arranged to have an air stream flow against,
    at least one hood constructed and arranged to, when in a closed position, block an opening that is made at said aerodynamic surface, at least one locking mechanism constructed and arranged to keep the at least one hood in the closed position, an access flap constructed and arranged to provide access to the at least one locking mechanism of the hood, the access flap constructed and arranged to pivot relative to the hood around an axis that is essentially parallel to a direction of flow of the air stream, the access flap being constructed and arranged to keep the access flap flattened against the hood, a protective device for protecting the access flap including:
- a coverage plate constructed and arranged to pivot around an axis of rotation, the axis of rotation being perpendicular to the direction of flow of the air stream,
- wherein said coverage plate is constructed and arranged to pivot between a first position in which the coverage plate is arranged projecting relative to the aerodynamic surface and a second position in which said coverage plate is flattened against an outside surface of the access flap in such a way that the protective device limits an appearance of a scoop phenomenon.

* * * * *